United States Patent [19]

Strobel

[11] Patent Number: 5,583,970
[45] Date of Patent: Dec. 10, 1996

[54] PRINTER COMMAND SET FOR CONTROLLING ADDRESS AND POSTAL CODE PRINTING FUNCTIONS

[75] Inventor: Kevin L. Strobel, Fairfield, Conn.

[73] Assignee: Pitney Bowes Inc., Stamford, Conn.

[21] Appl. No.: 395,561

[22] Filed: Feb. 28, 1995

[51] Int. Cl.⁶ ................................................. G06F 15/00
[52] U.S. Cl. ........................................ 395/114; 395/117
[58] Field of Search ................................... 395/114, 112, 395/117, 101, 147, 140, 113; 235/375, 432, 462, 463; 364/478; 400/76, 104

[56] References Cited

U.S. PATENT DOCUMENTS

| | | | |
|---|---|---|---|
| 4,796,196 | 1/1989 | Durst, Jr. et al. | 364/478 |
| 4,797,832 | 1/1989 | Axelrod et al. | 364/478 |
| 4,800,505 | 1/1989 | Axelrod et al. | 364/478 |
| 4,858,907 | 8/1989 | Eisner et al. | 271/124 |
| 5,021,975 | 6/1991 | Yamanashi | 364/519 |
| 5,175,691 | 12/1992 | Baker et al. | 364/478 |
| 5,278,947 | 1/1994 | Balga, Jr. et al. | 395/117 |
| 5,287,538 | 2/1994 | Kawakami et al. | 395/800 |
| 5,291,002 | 3/1994 | Agnew et al. | 235/375 |
| 5,326,181 | 7/1994 | Eisner et al. | 400/104 |
| 5,384,886 | 1/1995 | Rourke | 395/147 |
| 5,387,783 | 2/1995 | Mihm et al. | 235/375 |

Primary Examiner—Mark R. Powell
Assistant Examiner—Dov Popovici
Attorney, Agent, or Firm—Robert H. Whisker; Melvin J. Sconick

[57] ABSTRACT

The invention is a method and system for printing images to a substrate wherein the commands normally input by an operator, or resident within the printer, can be determined at a host data processor. The system can control address and postal code printing functions beginning at the host computer together. The system will derive printing data, including address data, from a selected application resident in the host computer. The host computer creates and then transmits printer command sets and printing data, via transmitting means to a microprocessor within the printer. The microprocessor drives a language interpreter which directs the printer commands to a parsing step for determining the address location from within the data to be printed. The language interpreter then assigns delivery point digits to a zip code that was isolated from the transmitted address data. The newly created zip code is then matched with the bar code data stored within the microprocessor's corresponding memory. A bar code corresponding to the new zip code is selected. The language interpreter then directs the printer's controller to prepare to print the address with its corresponding zip code, any graphics images that may have been included within the print data, and text, if any. The printer controller positions the bar code for printing, and then prints the bar code and address data, zip code, and any graphics images and text to an envelope or other substrate.

13 Claims, 5 Drawing Sheets

PRINTER COMMAND SET FOR CONTROLLING ADDRESS AND POSTAL CODE PRINTING FUNCTIONS

BACKGROUND OF THE INVENTION

This invention relates to the field of envelope addressing systems. More particularly, it relates to the printer commands used by systems that imprint a machine readable bar code address at the same time as imprinting a legible human readable address.

Certain elements of the postal graphics printing and postal code extraction commands for a series of printers utilizing the present invention, were publicly demonstrated, though not specifically disclosed, on Mar. 1, 1994 during a product demonstration. These commands do not include the present invention, but are executed by the system printer concurrently therewith.

The Post Office currently utilizes automated mail sorters which sort envelopes on the basis of a zip code encoded as an imprinted machine readable bar code. To be acceptable for use, the encoded bar code must meet strict specifications as to size, spacing of parallel bars, and placement upon the envelope. Accordingly, there is a need for accurate, but relatively inexpensive addressing or printing systems that will print bar codes at the same time that they print the legible address.

As the U.S. Postal Service, together with the postal services of other countries around the world, moves toward more fully automated mail handling in an effort to contain costs while processing ever increasing volumes of mail, automated equipment which sorts and processes mail on the basis of machine readable postal codes, such as the "zip code" or other forms of postal coding, play an ever more significant role. In the U.S., Postal Service regulations provide for a "Postnet" bar code which represents the five or nine digit zip code of the destination address in a machine readable form.

Systems have been used or proposed to meet the need to produce mail pieces imprinted with the Postnet bar code, and to enable mailers to obtain the benefit of the discounts offered for such mail. One such system is described in U.S. Pat. No. 4,858,907, for a SYSTEM FOR FEEDING ENVELOPES FOR SIMULTANEOUS PRINTING OF ADDRESSES AND BAR CODES, issued to Eisner et al. on Aug. 22, 1989. This patent discloses a system for printing envelopes with addresses, zip codes, and corresponding bar codes. The system is controlled by a computer which includes software for converting a zip code included in the address into bar code form and then adding the bar code representation to the material to be printed on the envelope.

Another example of the art is found in U.S. Pat. No. 5,326,181 for an ENVELOPE ADDRESSING SYSTEM ADAPTED TO SIMULTANEOUSLY PRINT ADDRESSES AND BAR CODES; issued on Jul. 5, 1994 to Eisner et al. This Pat. teaches a method of addressing substrates with a human readable address containing a zip code and a bar code corresponding to the zip code. The method utilizes a computer and comprises several steps. These steps include: receiving in the computer a plurality of addresses, with pre-existing zip code information contained in each as complete address data, and requiring no manual inputting or identification; automatically scanning the address data in the computer to find the pre-existing zip code; automatically converting, in the computer, the pre-existing zip code into a line of corresponding bar code; and, essentially simultaneously printing the complete address, including zip code information and corresponding bar code, on a substrate, under control of the computer so that the substrate produced has human readable zip code and machine readable bar code information thereon.

Both of the Eisner et al. U.S. Pat. No. (4,858,907 and 5,326,181) address the specific need of mailers to reduce costs by utilizing a postnet bar code when printing to a mail piece. However, the level of flexibility of the system does not allow it to consistently select addresses from amongst data containing address data together with graphics or text data. Flexibility is reduced because the printing commands are input separately from the address; and, therefore the language interpreter of the printer, particularly during high volume sequences, can not distinguish an address from a data field containing graphics or text data. Printing commands are either preset at the printer or are selected by the operator through the printer operator panel.

Additionally, a system for printing envelopes with addresses including bar code is disclosed in commonly assigned U.S. Pat. No. 5,175,692 for a SYSTEM AND METHOD FOR CONTROLLING AN APPARATUS TO PRODUCE ITEMS IN SELECTED CONFIGURATIONS; issued on Dec. 29, 1992 to Baker et al., which describes a system for printing mail pieces which includes a printer for printing sheets and envelope forms and a foldersealer mechanism for folding the envelope form around the sheets to form a mail piece, and a computer based control system for controlling the printer and folder. In the system of this application, when an operator is creating a file of letters to be printed, the operator may designate a selected field within each letter as containing the destination address. The system will then extract the information in this designated field and with it create a new page of material to be printed on the envelope form; and, if the address within the designated field includes a zip code, the system will add a corresponding barcode to the new page. The system then adds this new page to the file before the file is output. This system however, requires specially developed software and hardware that, while extremely effective, reduces business flexibility.

U.S. Pat. No. 5,278,947 for a SYSTEM FOR AUTOMATIC PRINTING OF MAIL PIECES; issued Jan. 11, 1994 to Balga, Jr. et al., is for a system which includes a printer for printing text in response to the input of signals. The printer has a capability to selectively print either sheets or envelopes. The system further includes a controller for output of a sequence of signals representative of materials to be printed on a sheet which forms part of the mail piece, where the sequence includes a subset of signals representative of an address.

In accordance with another aspect of the Balga et al. invention, the system includes a scanning mechanism for identifying a character string which conforms to a valid postal coding standard. The system further includes a mechanism for identifying the character string as a valid postal code. Additionally, the system forms the destination address to include a line including the postal code and a selected number of proceeding lines of text.

Balga et al., however, does not allow the system operator to control parsing of the address and zip code data. Parsing is set as a fixed command within the host application. Neither does the Balga et al. art utilize the printer for the storing of rules that guide determination of the delivery point digits or that guide determination of the bar code. Thus, there is little flexibility in the Balga et al. teachings with respect to printing large amounts of combined data types.

The prior art has thus addressed specific needs of applications utilizing an addressing printer that may or may not have its own computing capability. But, the prior art has done so at the expense of flexibility. For instance, a growing trend has been to include graphics when imprinting envelopes or other substrates. The use of graphics allows the mailer to promote certain services or simply to promote the mailer's good name. If a printing system had to imprint every envelope twice, once to get the address and bar code printed and a second time for a graphics imprinting then there would be great cost to the mailer, at least in terms of time. Thus, it is an object of the present invention to provide a printer that can assemble address data together with graphics data and still be able to assign a proper barcode while reducing the need for operator interface at the printer. The print field of the present invention can be more complex and more relevant to the needs of the mailer.

The present invention overcomes the limitation of the prior art by providing flexibility in determining what data, and how much, may be downloaded for printing to a substrate. Flexibility is accomplished by controlling address and postal coding functions in the printer from a host computer. The invention thus simplifies the firmware required in a selected printer, or could allow the performance of additional tasks or provide for greater database functionality under the direction of the printer microprocessor. Thus, printer ROM memory can be reduced or freed up for other tasks, and RAM memory can be increased to handle more detailed data.

SUMMARY OF THE INVENTION

According to the invention, the object is achieved and the disadvantages of the prior art are overcome by a method and system for printing images on a substrate wherein the commands normally input by an operator, or resident within the printer, can be determined or created at a host data processor (computer).

The system can control address and postal code printing functions beginning at the host computer together with its resident application program. The system will derive printing data, including address data, from a selected application resident in the host computer. The host computer creates and then transmits printer command sets and printing data, via transmitting means, which can include: direct interface cabling; modem; download to a storage medium for subsequent uploading; and, networking devices.

A microprocessor contained within the printer accepts printer command sets and corresponding data to be printed. The microprocessor drives a language interpreter which directs the printer commands to a parsing step for determining the address location from within the data to be printed.

The language interpreter then assigns delivery point digits to a zip code that was isolated from the transmitted address data. The newly created zip code is then matched with the bar code data stored within the microprocessor's corresponding memory. A bar code corresponding to the new zip code is selected and the language interpreter then directs the printer's controller to prepare to print the address with its corresponding zip code, any graphics images that may have been included within the print data, and text, if any. The printer controller positions the bar code for printing, and then prints the bar code and address data, including the zip code, together with any graphics images and text, to an envelope or other substrate.

DETAILED DESCRIPTION OF THE PREFERRED EMBODIMENTS

Figure 1:
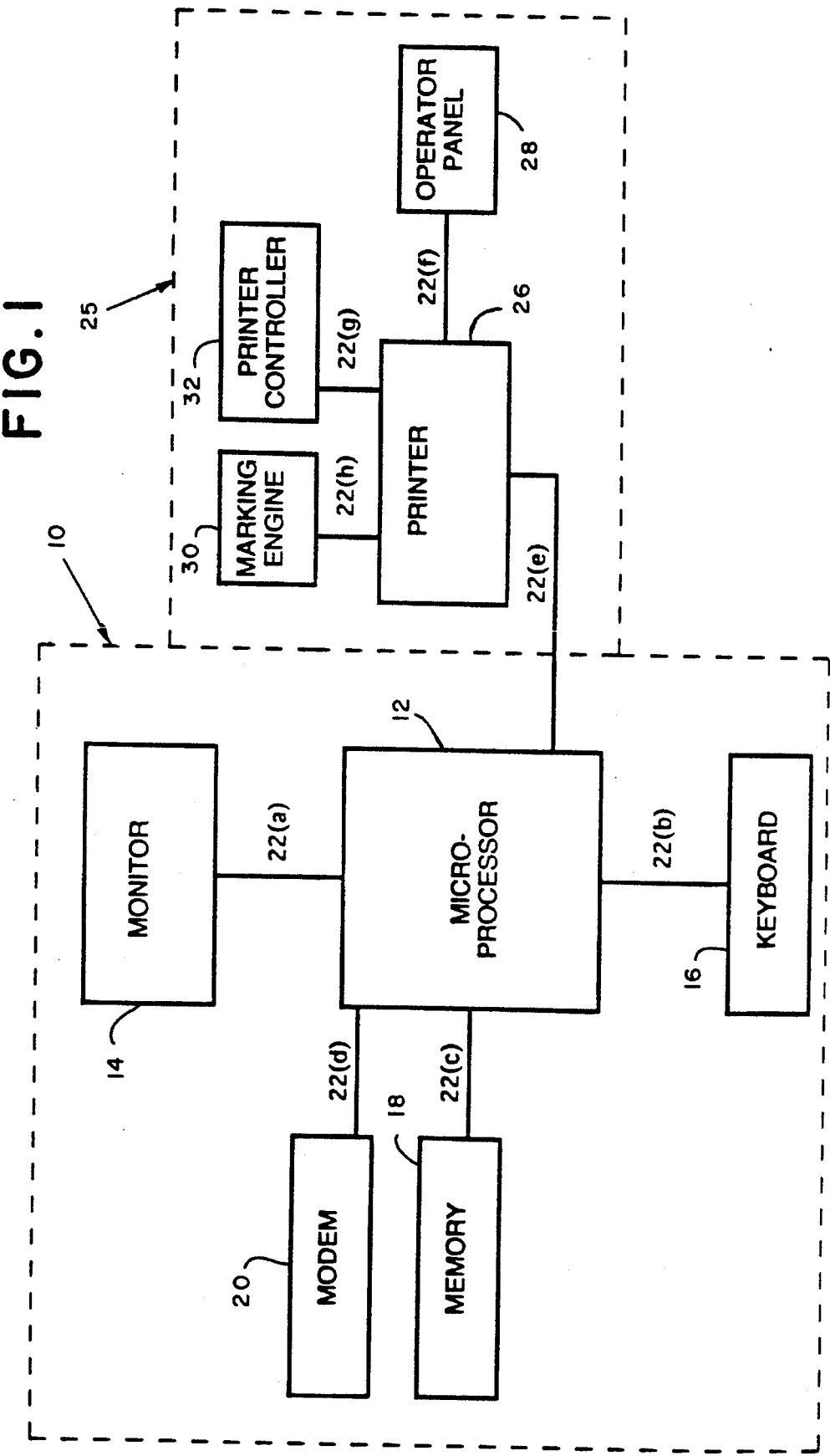
FIG. 1 is a block diagram of an addressing system, utilizing a printer, which may incorporate the present invention.

Turning to FIG. 1, there are depicted in block form two subsets that, combined, form an addressing system.

Addressing subsystem 10 includes: microprocessor 12 connected to monitor 14 by interface cable 22a; keyboard 16 connected to microprocessor 12 by interface cable 22b; memory 18 connected to microprocessor 12 by interface cable 22c; modem 20 connected to microprocessor 12 by interface cable 22d; and interface cable 22e for connection to addressing subsystem 25.

Addressing subsystem 25 includes: printer 26 connected to addressing subsystem 10 by interface cable 22e; operator panel 28 operatively connected to printer 26 at 22f; printer controller 32 operatively connected to printer 26 at 22g; and, marking engine 30 operatively connected to printer 26 at 22h.

A microcomputer, or any computer that can download data that can be printed on a printer whether that printer is a peripheral device of the computer or not, uses application programs for creating data. These are resident in the microcomputer ROM memory and in memory 18. The printers commonly utilized in the addressing art may also contain a microprocessor that is able to assign bar code data to addresses that are delivered from the host.

Figure 2A:
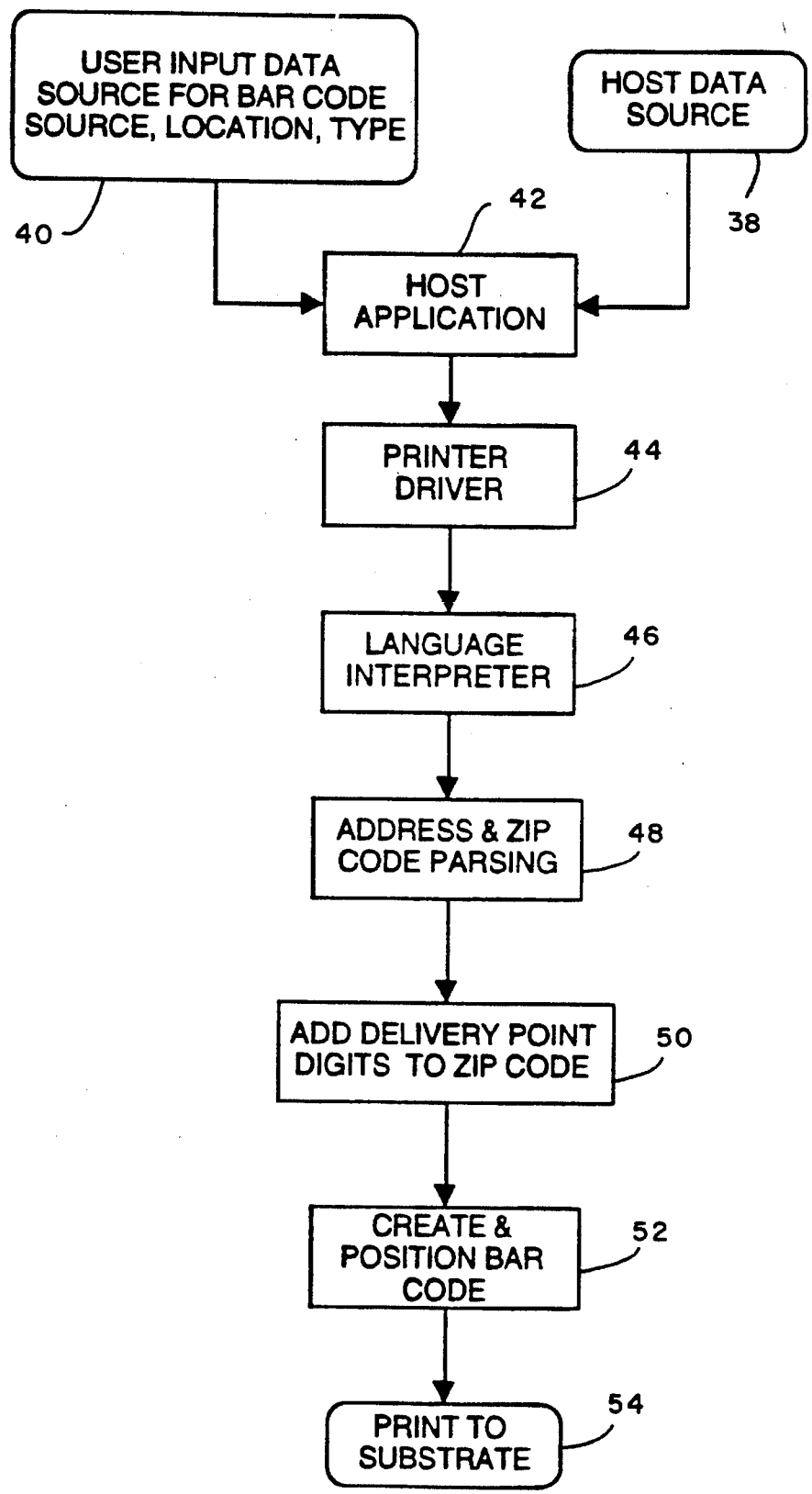
FIG. 2A is a high level flow chart of the process utilizing the system of FIG. 1.

Turning to FIG. 2A, a preferred embodiment of the subject invention is depicted wherein data is provided to a host application at step 38 by host microprocessor 12. At step 40, which can take place simultaneously with step 38, a system operator can enter printer commands and bar code printing data to the host application. The host application, at step 42, assembles the data to be printed to a substrate. In addition to print data, the host application can pass printer commands that will be utilized by a language interpreter located within the printer. The combined data, print data plus commands, are downloaded to the printer driver at step 44. The printer driver will prepare the printer to receive the combined data.

The system advances to step 46 where the printer driver has downloaded the combined data to the printer which has placed the data under the control of the language interpreter. The language interpreter will then begin to perform address and zip code parsing based upon the combined data received. Thus, if the address data is to be separated out from graphics data, commands input at step 40 will control step 48. The address is scanned for a zip code and then the language interpreter advances to step 50.

The elements of a postal zip code consist of four parts; these are: (i) the "zip code," which consists of 5 digits and refers to geographic area or zone; (ii) the "zip plus 4" further breaks down a zip code region into smaller sub-regions, this consists of four digits added to the base zip code; (iii) "delivery point digits" which consist of two additional digits that further break down a zip plus 4 so that the United States Postal Service (U.S.P.S.) can more accurately pin point an exact location; and, (iv) a check sum digit. The "delivery point digits" are abstracted from the street line of the address using a U.S.P.S. approved algorithm.

At step 50, the language interpreter will determine the delivery point digits to be added to the zip code. If the system operator input command sets at step 40 that govern the ability to read zip code data, then the commands that are input at step 40 will control step 50.

When the delivery point digits have been added to the zip code, the language interpreter will direct, at step 52, that a bar code be determined that corresponds to the newly created zip code. The determination of the bar code is subject to a series of rules resident in the printer memory; these rules correspond to bar code type and translate the human readable zip code to the machine readable bar code. The bar code will then be positioned for printing to the selected substrate. The system then advances to step 54 where the bar code, address data, and graphics data if any, are printed on the substrate.

The ability to print mixed bar code, address, and graphics data comes from the control of the print commands, where that control is at the host microprocessor (computer). The system flow of prior art systems is depicted in FIG. 2B.

Figure 2B:
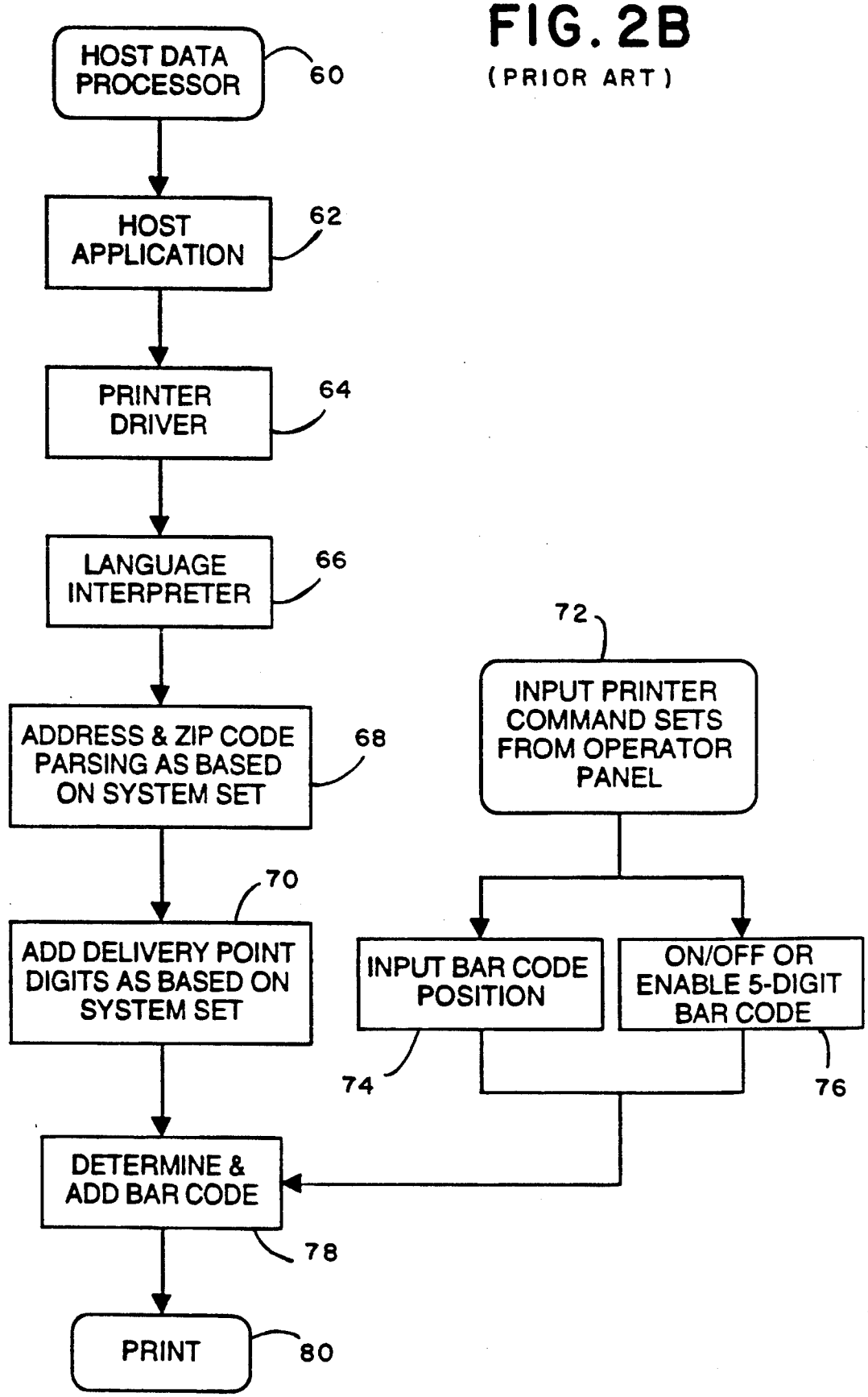
FIG. 2B is a high level flow chart of a prior art process utilizing the system of FIG. 1.

Turning to FIG. 2B, data is provided to a host application at step 60 by host microprocessor 12. The host application, at step 62, assembles the data to be printed to a substrate. The data can include both address and graphics data. The data is downloaded to the printer driver at step 64 which will prepare the printer to receive the data.

The system advances to step 66 where the printer driver downloads the data to the printer which has placed the data under the control of the language interpreter. The language interpreter will then begin to perform address and zip code parsing on data received. The printer commands for address and zip code parsing are set commands based upon rules that are called up by the printer microprocessor. The address is scanned for a zip code and then the language interpreter advances to step 70.

At step 70, the language interpreter will determine the delivery point digits to be added to the zip code. The printer commands for determination of the delivery point digits to be added to the scanned zip code are set printer commands based upon rules that are called up by the printer microprocessor.

When the delivery point digits have been added to the zip code, the language interpreter will direct, at step 78, that a bar code be determined that corresponds to the newly created zip code. The determination of the bar code is subject to a series of rules resident in the printer memory; these rules correspond to bar code type and translate the human readable zip code to the machine readable bar code. The bar code will then be positioned for printing to the selected substrate. Step 78 is influenced by the input of operator commands through the printer operator panel at step 72. From step 72, the system advances to step 74 where the position of the bar code for printing can be input by the system operator. Also from step 72, the system can advance to step 76 where the system operator can select "on" or "off" with respect to the system's ability to create and print a 5 digit bar code. Additionally, the system operator can select "enable" for the 5 digit bar code which will permit use of the feature only when required.

Both steps 74 and 76 advance to step 78; step 78 has been discussed above. From step 78, the system then advances to step 80 where the bar code, address data, and graphics data if any, are printed to the substrate.

Figure 3A:
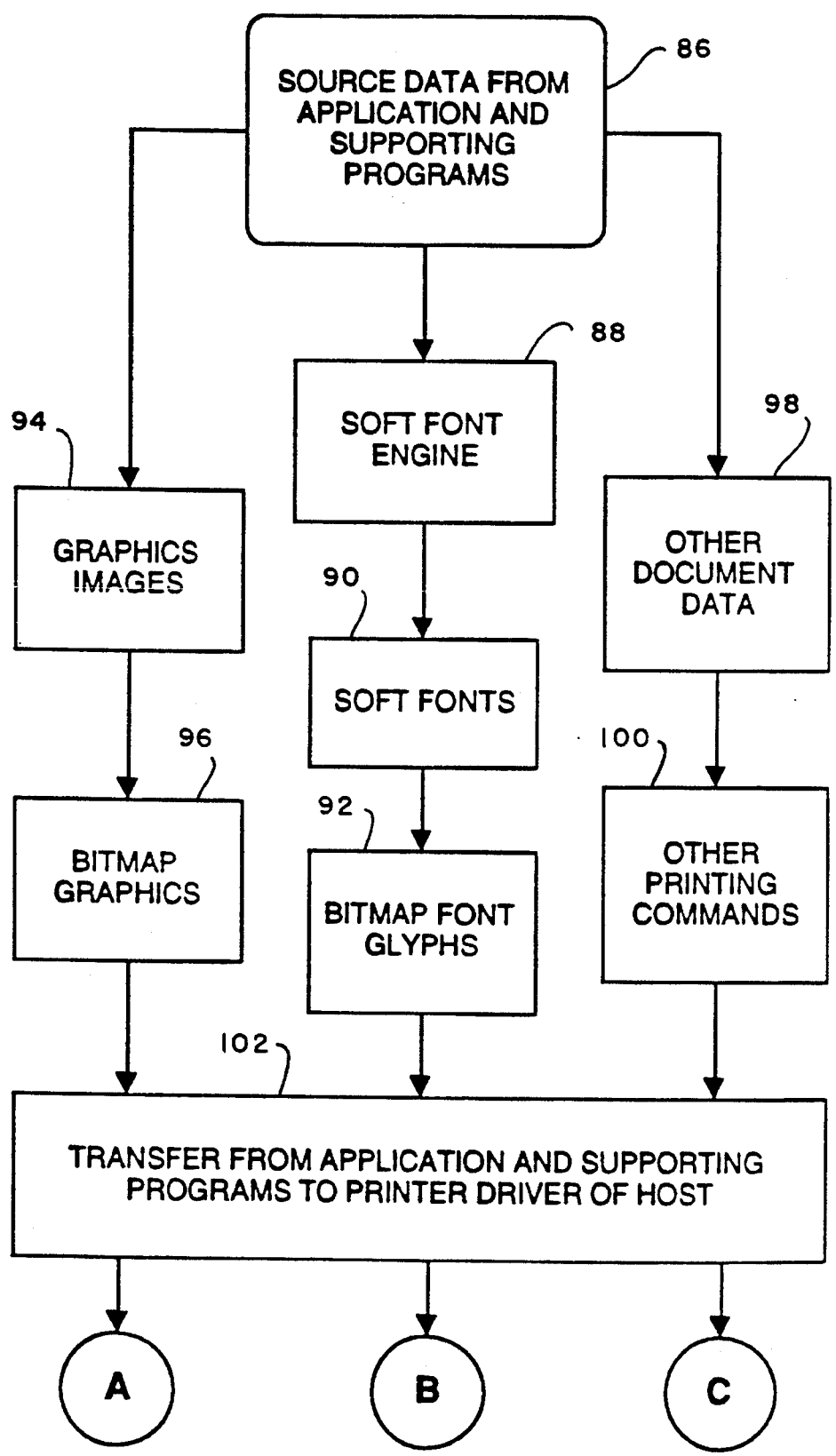
FIG. 3A and FIG. 3B are detailed flowcharts of the commands and data print stream that are initiated at the host microprocessor and terminate as an image being printed to a substrate.
Figure 3B:
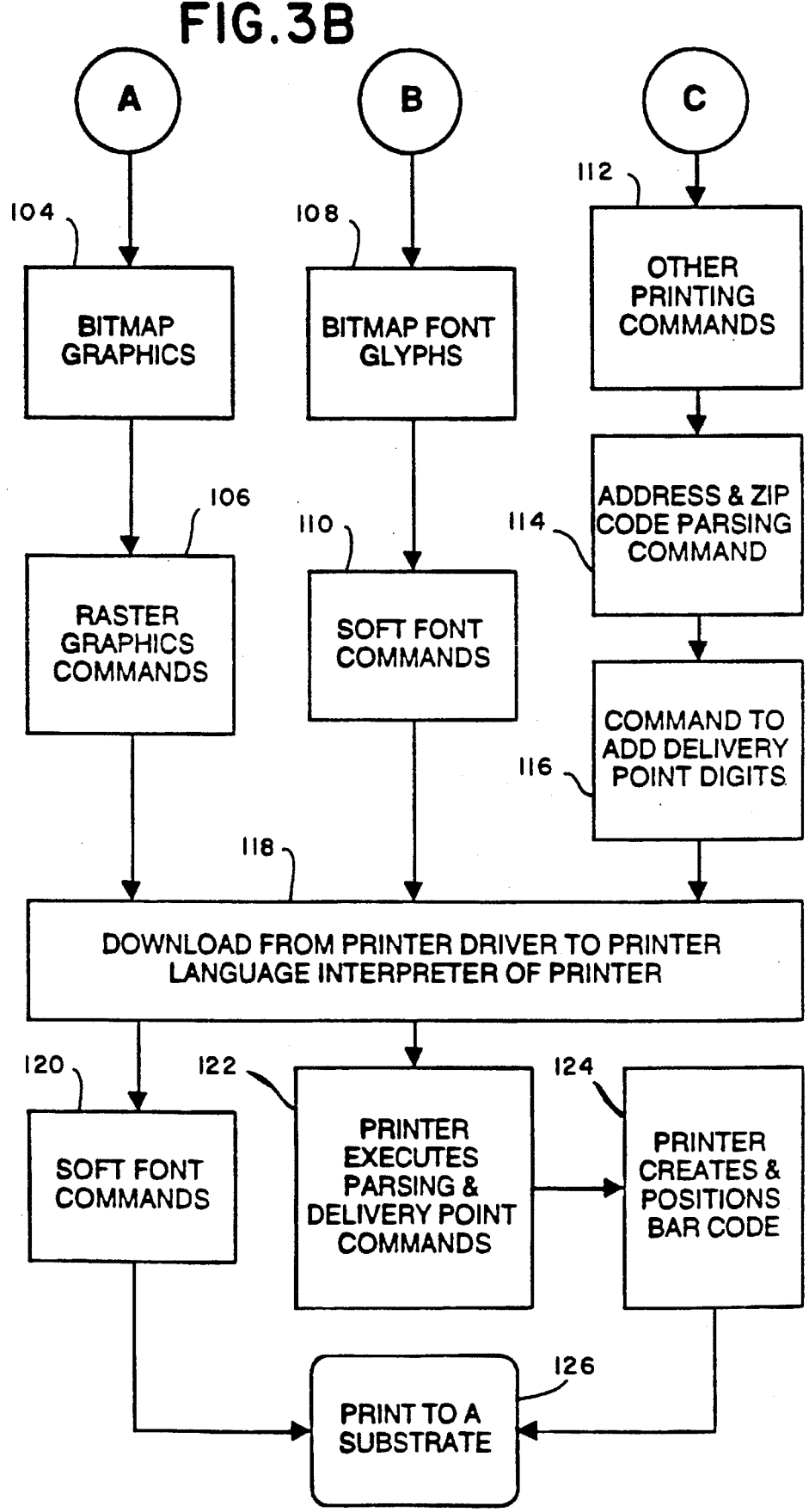

FIGS. 3A and 3B depict, in detail, the flow of data and commands that emanate from a host application and result in a printing to a substrate. Turning to FIGS. 3A and 3B, source data 86 from the application utilizes soft font engine 88 to produce soft fonts 90. Soft fonts 90 are converted to bitmap font glyphs 92 and then transferred 102 from the application to the printer driver. After transferring 102 bitmap font glyphs 92 to the printer driver, the font glyphs are redesignated as bitmap font glyphs 108 and these are assigned soft font commands 110 before being downloaded 118 from the printer driver to the printer language interpreter. After downloading 118, soft font commands 110 are redesignated as soft font commands 120 and then stored in the printer 26 memory to await additional data prior to being printed at 126.

Additionally, in FIGS. 3A and 3B, source data 86 from the application produces other document data 98 which is assigned other printing commands 100 and then transferred 102 from the application to the printer driver. Other printing commands 100 are redesignated as other printing commands 112 to which are added address and zip code parsing commands 114. The system then determines and adds delivery point digits 116 to the parsed zip code prior to being downloaded 118 from the printer driver to the printer language interpreter. The printer language interpreter takes the downloaded parsing and delivery point commands and executes them at 122. The system then advances to 124 where the printer creates and positions the bar code prior to printing to a substrate at step 126.

The use of raster graphics commands is also illustrated in FIGS. 3A and 3B. Source data 86 from the application produces graphic images 94 which are converted to bitmap graphics 96 and then transferred 102 from the application to the printer driver. Bitmap graphics 96 are redesignated as bitmap graphics 104 and then assigned raster graphics commands 106. Raster graphics commands are downloaded 118 from the printer driver to the printer language interpreter where they are assigned soft font commands 120 before being printed to a substrate at 126.

As can be appreciated by those skilled in the art, a number of variations of the subject invention are possible. These variations include, but are not limited to: the range of printer types that can utilize the inventive method; the applications that produce the data to be converted into data to be printed; the downloading of the printer data commands to tape, diskette or similar storage medium for the purpose of transferring the commands to a printer that is not operatively connected to the host application; and, the general configuration of the host computer and its array of peripherals.

What is claimed is:

1. A system for controlling address and postal code printing functions, comprising:

(a) host data processing means for creating and transmitting printer command sets and a plurality of printing data, to a printer, said printer command sets comprising commands to be executed by said printer for:
      (i) parsing address and zip code data;
      (ii) creating a set of delivery point digits and adding said set of delivery point digits to a zip code;
      (iii) creating a bar code in respect of said zip code; and
      (iv) positioning said bar code for printing;

(b) transmitting means for transmitting said printer command sets and said plurality of printing data;

(c) microprocessor means contained within said printer for accepting said printer command sets and said plurality of printing data;

(d) language interpreter means for:
  (i) directing printer commands to a parsing step for determining address data from within said plurality of printing data,
  (ii) assigning delivery point digits to a zip code selected from said address data,
  (iii) selecting a bar code from a plurality of bar code data stored within a memory of said printer, said bar code corresponding to said zip code data plus said delivery point digits; and
  (iv) directing a printer controller to prepare to print; and
(e) printing means for printing addresses and bar codes on a substrate.

2. The system of claim 1, wherein said microprocessor means contains first memory means for storing a plurality of zip code data.

3. The system of claim 2, wherein said microprocessor means contains second memory means for storing a plurality of bar code data within a database.

4. The system of claim 1, wherein said substrate is one or more envelopes.

5. The system of claim 1, wherein said substrate is one or more sheets to be printed upon.

6. The system of claim 1, further comprising means for selectively controlling said printer to print upon a plurality of said substrate sequentially.

7. A method for printing a sequence of mail pieces, said method comprising the steps of:
  (a) deriving data, including address data, from a selected application resident in a host data processor;
  (b) transferring said derived data, from said selected application, to a printer driver resident in said host data processor;
  (c) creating printer commands that will control a first parsing sequence for a set of address data, said first parsing sequence to be performed by a printer;
  (d) creating printer commands that will control a second parsing sequence for a set of zip code data, said second parsing sequence to be performed by said printer;
  (e) transferring said derived data and said printer commands, from said printer driver to a printer language interpreter resident in said printer;
  (f) performing said first and said second parsing sequence in said printer;
  (g) adding delivery point digits to zip code data in respect of said address data;
  (h) creating a bar code in respect of said zip code data together with said delivery point digits;
  (i) positioning said bar code in respect of a substrate positioned for printing thereupon; and
  (j) printing to said substrate said derived data and said created bar code.

8. The method of claim 7, wherein said derived data further comprises:
  (a) said zip code data;
  (b) said address data;
  (c) graphics images; and
  (d) text.

9. The method of claim 8 wherein said zip code data, said address data, said graphics images, and said text are distinguished from each other by a first set of rules utilized by said printer driver so that said printer driver can create said printer commands.

10. The method of claim 7, wherein a second set of rules for deriving said delivery point digits are stored in a first memory within said printer.

11. The method of claim 7, wherein the bar code data is stored in a second memory within said printer.

12. The method of claim 7, wherein said delivery point digits are derived from said address data in respect of a second set of rules and said delivery point digits are added to said zip code data to produce a second zip code.

13. The method of claim 12, wherein said second zip code is matched to the bar code data to determine a specific bar code to be selected for printing on said substrate.

* * * * *